United States Patent [19]

Morel et al.

[11] Patent Number: 4,828,776
[45] Date of Patent: May 9, 1989

[54] PROCESS FOR IMPREGNATING WITH THERMOPLASTIC OR THERMOSETTING POLYMERS IN SOLID STATE FIBERS OF GREAT LENGTH

[75] Inventors: Emile M. J. Morel, Paris; Gabriel M. Richert, Bretigny sur Orge, both of France

[73] Assignee: Institut National de Recherche Chimique Appliqued, Paris, France

[21] Appl. No.: 56,366

[22] Filed: May 28, 1987

Related U.S. Application Data

[63] Continuation-in-part of Ser. No. 584,986, Mar. 1, 1984, abandoned.

[30] Foreign Application Priority Data

Mar. 10, 1983 [FR] France .................................. 83 03938

[51] Int. Cl.$^4$ ............................................. B05D 1/18
[52] U.S. Cl. .................................... 264/136; 264/257; 264/331.11; 427/180; 427/374.4; 427/385.5; 427/434.6
[58] Field of Search ........... 264/136, 137, 257, 331.11; 156/166, 169, 181; 427/375, 434.6, 374.4, 385.5, 180; 428/372

[56] References Cited

U.S. PATENT DOCUMENTS

| | | | |
|---|---|---|---|
| 2,877,501 | 3/1959 | Bradt | 264/261 |
| 3,042,569 | 7/1962 | Paul | 156/166 |
| 3,044,899 | 7/1962 | Canterino | 427/375 |
| 3,391,052 | 7/1968 | Marzocchi | 156/166 |
| 3,432,339 | 3/1969 | Howell et al. | 427/375 |
| 3,530,212 | 9/1970 | Kienle et al. | 264/137 |
| 3,737,352 | 6/1973 | Avis et al. | 156/166 |
| 3,776,752 | 12/1973 | Craven | 427/375 |
| 3,940,464 | 2/1976 | Davis et al. | 264/137 |
| 4,035,528 | 2/1977 | Poppe et al. | 427/375 |
| 4,058,581 | 4/1977 | Park | 264/137 |
| 4,305,770 | 12/1981 | Stiles | 264/137 |
| 4,382,056 | 5/1983 | Coonrad | 264/137 |
| 4,388,422 | 6/1983 | Gerteisen et al. | 523/217 |
| 4,486,373 | 12/1984 | Kurauchi et al. | 264/137 |
| 4,632,366 | 1/1972 | Hiraja et al. | 427/375 |

FOREIGN PATENT DOCUMENTS 8121545 5/1983 France .

Primary Examiner—Jan H. Silbaugh
Assistant Examiner—Hubert C. Lorin
Attorney, Agent, or Firm—Browdy and Neimark

[57] ABSTRACT

A process for impregnating with thermoplastic as well as thermosetting polymers in solid state fibers of great length, comprises realizing in a non-aqueous inert and volatile liquid in the absence of any other moistening, dispersing or emulsifying agent, a suspension of the powder polymer, continuously passing through said suspension the fibers fed in a single and preferential direction, separating such fibers during their passage through the suspension or during their staying time therein, into their unitary elements or filaments so as to expose maximum surface of each of them to contact with said suspension, assembling said unitary elements or filaments to maintain, therebetween and within fibers leaving the suspension, a given quantity of polymer powder, as well distributed as possible, eliminating the suspension liquid, submitting the obtained impregnated fibers to a thermal treatment to bring the polymer to the liquid or pasty state, then supplying the assembly to a forming or preforming unit in order to obtain a finished or semi-finished product of the desired profile or shape, and so that said semi-finished product may serve at its turn for realizing finished products through application of known processings.

6 Claims, 2 Drawing Sheets

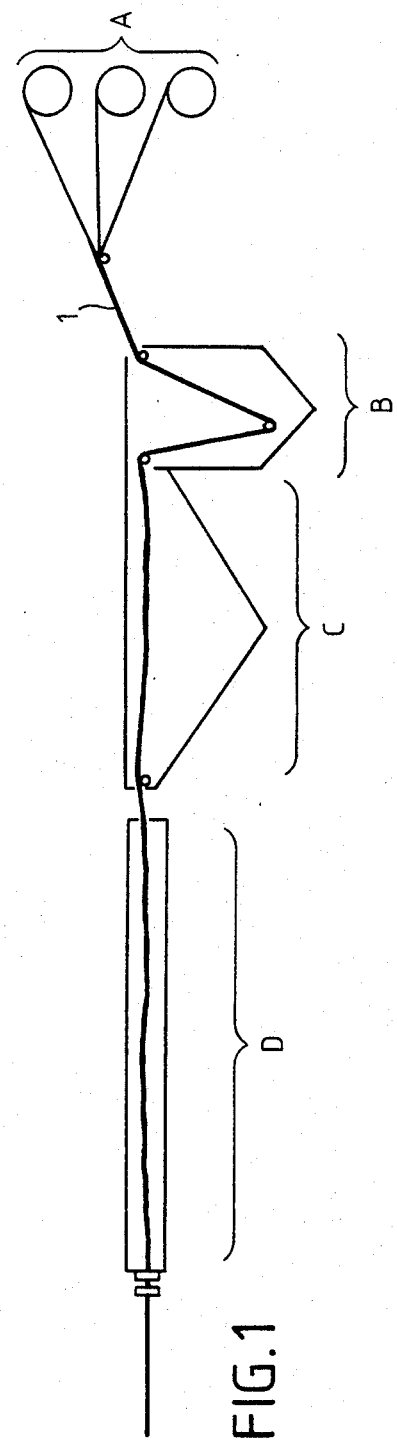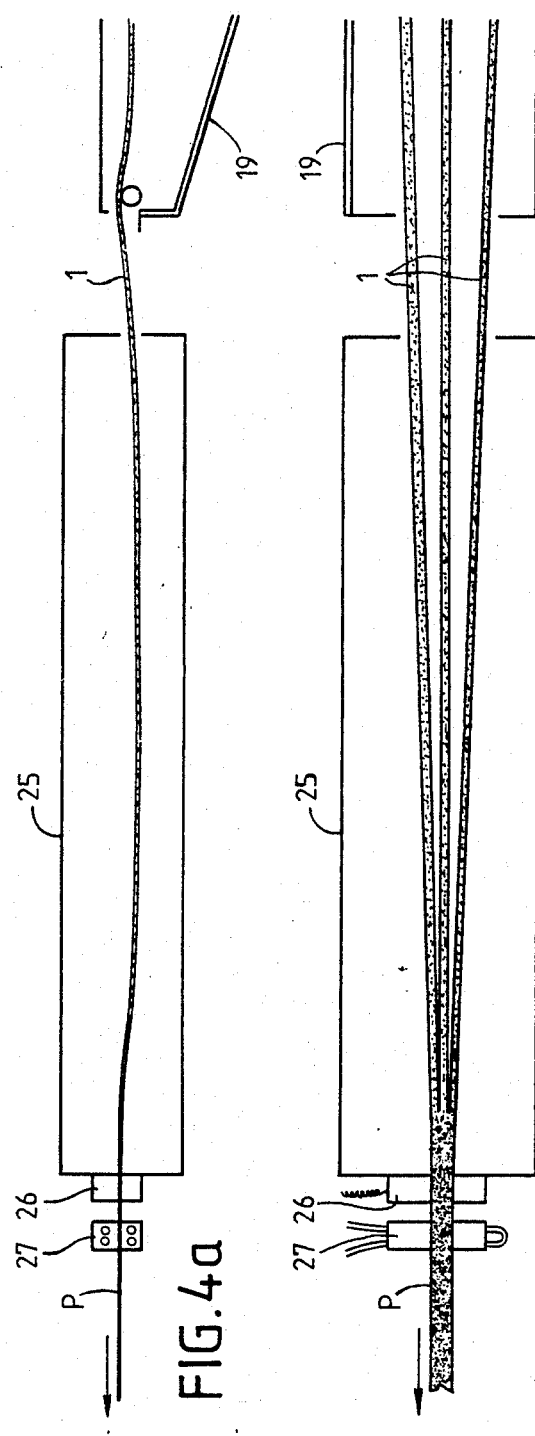

PROCESS FOR IMPREGNATING WITH THERMOPLASTIC OR THERMOSETTING POLYMERS IN SOLID STATE FIBERS OF GREAT LENGTH

This application is a continuation-in-part of Ser. No. 584,986, filed Mar. 1, 1984, now abandoned.

This invention relates to a process for impregnating with thermoplastic or thermosetting polymers in solid state, fibers of great length such as yarns, filaments, roves and the like (all these elements are called "fibers" hereinafter) as well as means for carrying out this process.

It is known that the presence of continuous fibers as reinforcing elements, most often made of glass or carbon, unidirectional or presenting preferential orientation, produces high mechanical strength materials.

Processes for impregnation of long fibers by polymers are known at the present time. In case of thermosetting resins, the polymer is used in a molten state or brought into solution; in case of thermoplastic materials the polymer is either used in solution or maintained in a fluidized bed or in suspension in water or in form of a plastisol.

It is to be noted that in the case of impregnation by resins in molten state, such process is rendered difficult due to the high viscosity of the resins used, the fibrils having moreover the tendency of coming together and the depth penetration of the polymer not being easy.

Moreover, the use of polymers in solid state raises specific problems. The processes used for solving them only described in respect to thermoplastic materials are generally based on the powder polymer being dry carried along by the reinforcing fibers either directly from the powder in bulk or from the powder in a fluidized bed. Controlling the quantities carried along is complicated and the resulting irregularities lead to variations in the quality of the desired finished material.

Furthermore, such processes to be carried out in practice require regular grain size and grain shape. The products must not be sticky or lumpable; there should be an optimum dimension of the grains in respect to the flowing characteristics of each powder, hence resulting in rigidity of use; each product requires optimum adaptation.

However, even when such conditions are respected, the take up rate of the polymer upon passage of fibers in the fluidized bed is difficult to control as mentioned above, thereby rendering the reinforcing rate controllable with difficulty.

Furthermore, it is to be noted in respect to fluidization impregnation, that difficulties occur due to electrostatic phenomena which constitute a source of instability.

It has also been proposed (see French Pat. Nos. 81 21545 and 80 08406, and U.S. Pat. No. 2,877,501) to impregnate fibers by passing such fibers in a suspension, a dispersion or an emulsion of resin, either in water or in an unsaturated hydrocarbon or a plastisol.

When aqueous suspensions are employed it may be noted that water forms on the fibers a layer that results from an adsorption phenomenon which is very difficult, if not impossible, to eliminate, even by heating, thereby opposing adherence of resin to fibers. Substantial reduction of the final strength of the obtained material results therefrom.

This phenomenon is still amplified when the polymer and (or) the fiber (in case of aramide fibers) are themselves hydroscopic thereby requiring particular precautions to favor adherence between fibers and resin.

When suspensions, dispersions or emulsions are in the presence of hydrocarbon, it is almost impossible to ensure total elimination of hydrocarbon, thereby resulting in porosity in the final composite obtained, and hence diminition of its mechanical properties.

The presence of a moistening, dispersing or emulsifying agent which is often introduced is also an inconvenience; it is maintained in the final composite; it resists heat poorly and there are risks of decomposition thereof during subsequent melting of resin.

There will also be noted risks of subsequent chemical reactions between the components used if these are not of an "inert" nature with respect to one another.

It will also be noted that the known impregnation processes generally use thermoplastic polymers in case of powder resins. The case of thermosetting polymers is not contemplated therein.

However, this invention provides a process for impregnating continuous fibers with a polymer powder material either of the thermoplastic or thermosetting type, which remedies the aforementioned inconveniences. These fibers may be natural or synthetic, organic, mineral or metallic.

This process comprises providing in an inert and volatile liquid a suspension of a given concentration of the powder of the selected polymer, continuously passing in such suspension the fibers fed thereinto in a single preferential direction, separating such fibers when they pass through the suspension or during their staying time therein, if need be, into their unitary elements or filaments, so as to expose a maximum surface of each of them into contact with said suspension, bringing together such unitary elements or filaments to maintain therebetween, and within the fibers leaving the suspension, a given quantity of polymer powder distributed as well as possible, eliminating the suspension liquid by vaporization, submitting the obtained impregnated fibers to a thermal treatment to cause the polymer to become liquid or pasty, then supplying them altogether to a forming or preforming station in order to obtain a finished or semi-finished product to the desired profile or shape, such semi-finished product being usable in its turn to the production of finished products through application of known processes.

According to an advantageous feature, the inert and volatile liquid serving for bringing the polymer into suspension is a liquid of a density close to that of the polymer.

There may be cited among the liquids, suitable in case of polymers of a density of between 0.9 and 1.5, the volatile "organic solvents" such as trichlorotrifluoroethane, methanol or ethanol, alone or in admixture in suitable proportions.

The average particle size of the polymers used may be up to 500 microns. The size of the particles is preferably at least equal to the diameter of the fibers to be impregnated.

According to another advantageous feature, the concentration of the polymer in the suspension liquid is maintained at a constant predetermined value.

The invention also provides an installation for carrying out the process such as defined above.

Such installation is substantially characterized in that it comprises at least:

a socalled "coating" unit formed by an enclosure for containing the polymer suspension and comprising a device for continuously feeding fibers in a unidirectional manner, means for separating such fibers into their unitary filaments during passage thereof through the suspension, and means for bringing together such filaments at the suspension outlet;

a socalled "drying" unit for drying the polymer-loaded fibers;

a socalled "thermal treatment" unit to convert the polymer to the molten or pasty state; and a socalled "forming" or "preforming" unit.

According to further advantageous features:

the fibers are supplied to the "coating" unit in form of one or several roves discharged from one or more coils;

the means for separating such rove(s) into unitary filaments comprises an agitation and/or combing system;

the means for bringing together the unitary filaments previously separated (or moved apart) comprises a tensioning system to reform one or several roves similar to that (or those) fed at the beginning;

the "drying" unit comprises means for evaporating and collecting the suspension liquid;

the "thermal treatment" unit consists of a heating space in which the polymer is brought to the temperature of melting, becomes viscous, or pasty; and the "forming" or "preforming" unit consists of a die or a mold of any known type.

According to other advantageous feature, the installation can also comprise:

a polymer suspension concentration detector servo-controlling a polymer and/or liquid distributor;

means for recovering both the evaporated liquid and the polymer powder separated from the fibers during their passage through the drying unit as well as opposite to the forming or preforming unit.

This invention also covers semi-finished or finished products with unidirectional reinforcement and thermo-setting or thermoplastic matrix.

The invention can also be applied to the production of semi-finished or finished products with composite unidirectional and isotropic reinforcement. As a matter of fact, according to a possible form of embodiment for carrying out the process such as defined above, an isotropic material of the mat type with long entangled fibers can be mixed with the unidirectional fibers before or after impregnation thereof. Such a mixture can be effected by presenting the fibers opposite a continuous strip of the isotropic material or between two continuous strips of the latter, in any step of the operation preceding the melting. Such association can be done either by presenting the fiber layer parallel to a continuous strip of the isotropic material, or between two strips of such fibers; or in the reversed condition, i.e. unidirectional fiber layer between two strips of the isotropic material, or any other interesting combination of these means.

Other characteristics and advantages of this invention will more clearly appear from the following description which is made by way of example and corresponds to the case of mineral glass or carbon fibers, in the light of the attached drawings, in which:

FIG. 1 is a schematic view of an installation for carrying out the process of this invention;

FIGS. 4a and 4b are respectively elevational and plan views showing travel of the roves, consisting of mineral fibers coated in the thermal treatment station before entering the forming or preforming unit.

Figure 2:
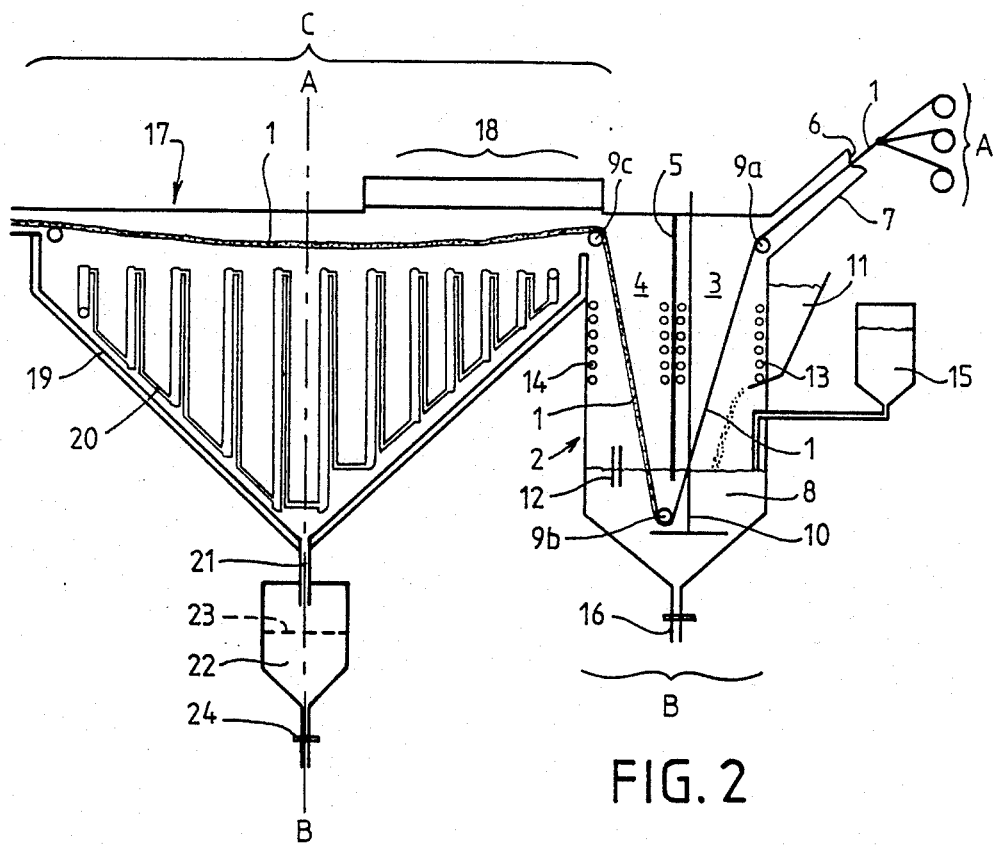
FIG. 2 is a schematic view of a possible form of embodiment of a coating unit in according with the invention.
Figure 3:
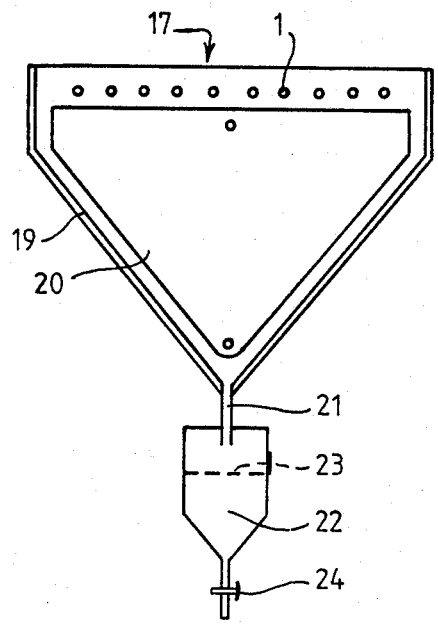
FIG. 3 is a sectional view along the line A-B of FIG. 2.

With reference to the drawings, an installation according to the invention essentially comprises a unit for continuously supplying one or more roves such as 1, a coating unit B which will be described with more detail hereinafter, and a drying station C, as well as a socalled "melting" unit D, which will also be described hereinafter.

Thus, a fiber layer 1 which may consist of parallel yarns penetrates an enclosure (comprising a certain number of equipments) wherein coating takes place. This enclosure is for example of a parallelepipedic form terminated at its base by a reversed pyramid provided at the end with a discharge system 16. The lower portion is filled with suspension polymer, the upper portion is divided into two portions 3 and 4, through a sealed wall 5 which extends a little below the liquid level; this wall is intended for preventing air from entering into the other parts of the unit.

The fiber layer 1 penetrates into section 3, for example, through an opening 6 extending obliquely upwardly and connected to chamber 3 through a tunnel 7 of sufficient length to prevent escape of vapours from the suspension liquid.

The opening 6 can be closed by two supple tongues disposed on one or the other side of the fiber layer 1.

The roves of unidirectional fibers are supplied from a series of coils A; they are maintained at the inlet to the zone 3, within the dispersion 8 and at the outlet from zone 4 by pluralities of free channeled rollers 9a, 9b, 9c for both feeding the fiber layer without friction or tension and maintaining regular spacing between the roves.

Upon passing within the polymer suspension 8 the yarns forming the roves are separated from one another thereby enabling the polymer particles to penetrate in depth and to be carried away by the progressing movement of the fiber layer.

The spacing of the roves is produced by a mechanical agitation system 10 or any similar combing means which simultaneously maintains the polymer particles homogeneously dispersed within the suspension medium.

Roves loaded with moistened powder then move up through the zone 4 up to the drive rollers 9c, whereupon they penetrate into the drying enclosure. These rollers, the drive speed of which is calculated for exerting traction upon the spaced filaments, are also intended for bringing the filaments close to one another and reconstituting a layer corresponding to the starting fiber layer 1.

The polymer suspension 8 is extemporaneously constituted by the polymer powder dispersion in a non aqueous liquid of a low boiling point and inert with respect to the polymer and the fibers; the compounds of the trichlorotrifluoroethane type are particularly suitable as their density is close enough to that of the technical polymers for which the machine is particularly intended.

The polymer grains are dispersed within the liquid simply through the mechanical action of an agitator without addition of a dispersing or emulsifying agent; one advantage of the process is permitting utilization of powder polymers having very different grain sizes and also, the shape of the grains not being a determining factor.

The carrying away of the polymer by the fiber layer 1 causes depletion of the suspension which is compensated for by the action of a distributor 11, with a detector 12 being intended for keeping the polymer concentration constant by initiating the operation of the distributor.

The liquid level tends to progressively decrease under the effect of two phenomena, i.e. the evaporation and the carrying away through the moistened fibers and powder.

The evaporation is limited through the action of refrigerating circuits, 13, 14, fitting the walls of the compartments 3 and 4; such circuits, to increase their efficiency, are supplied, as is the whole of the condensation devices in the apparatus, with fluid cooled to a temperature close to 0° C.

As to the liquid for moistening the fibers and the powder, it is recovered in the condenser which forms the second enclosure in the apparatus. As an extra precaution, the liquid level is maintained by a constant level source 15.

Finally, the coating enclosure 2 can be emptied through the tap 16 in case of cleaning or changing the polymer.

From the coating enclosure 2, the polymer powder-loaded layer penetrates into the drying enclosure 17 where the suspension medium is evaporated and recovered.

Evaporation is continued by passing under a series of heating elements 18; the dense vapour is collected in the enclosure 17 which in the illustrated embodiment has the shape of an inverted pyramid and the volume of which corresponds to the quantity of vapour formed. Such vapour condenses by contacting the cooled walls 19 and the internal elements 20 in which the same fluid as in elements 13 and 14 circulates. The condensed liquid is collected at the lower section and discharged through the recovery opening 21.

As the coated layer progresses, the liquid evaporates, and the polymer powder is no longer fixed by capillarity to the fibers but it is only maintained by the fibril network; small amounts thereof separate and collect with the liquid condensed in separator 22 which is constituted by a sealed container divided into two compartments by a horizontal slide supporting a filtering element 23 permitting separation of the powder and recovery of the condensed liquid through a tap 24.

As was already mentioned, the polymer suspension is provided on starting the installation, with its volume and concentration being regulated through the constant level liquid supply 15 and the detector 12 which acts upon the powder distributor 11, as need be. The fibers are loaded with polymer by mechanical carrying away of the polymer during their passage within the suspension.

The rate of carried material depends on a series of factors such as:
the polymer grain size;
the suspension concentration;
the speed of passage therethrough;
the rove tension.

For a given powder product, only the three last factors are susceptible to modification during the process. Practically, speed and tension are maintained constant and adjusting, by successive approximations, the concentration to a value which will be maintained fixed permits to obtain an almost constant fibers/polymer ratio.

At the outlet from the apparatus, the whole of fibers and polymer is supplied into a heating apparatus 25 where the polymer is heated to its melting or softening temperature, then passes through a set of successively hot and cold dies 26–27, wherein the material is densified and regularly distributed, and brought to the desired profile, then set in said profile.

Controlling the coating by progressive polymer enrichment permits to reach a stationary rate at which the polymer quantity is just sufficient for filling the die profile with a minimum material reflux.

Another form of embodiment of the densifying process may consist of using sets of adjustable spacing pressing rollers, successively hot, then cold, usable in particular for the realization of semi-products of planar cross-section and thermosetting matrix.

EXAMPLES OF MANUFACTURING REALIZED WITH THE COATING INSTALLATION ACCORDING TO THE INVENTION (1) A semi-product in form of a cylindric element of 3 mm diameter constituted by a matrix of polyethylene terephthalate and a reinforcement of 3 roves of carbon fibers, each comprising 10,000 strands. A plate molded from fragments of such element disposed in parallel and compressed after polymer melting presents a flexional strength of 1200 MPa at the ambient temperature and 600 MPa at 80° C., with the modules being 81,000 and 72,000 MPa respectively; the reinforcement rate is 48% by volume of the composite.

(2) Profiles of rectangular forms and different corss-sections: the following table shows several examples of properties measured directly on rectangular profiles constituted by different thermoplastic matrices reinforced by glass fibers E or unidirectional carbon fibers.

| Nature of reinforcement | Polymer | Reinf. rate % by volume | Profile cross-section mm × mm | Density | Flexional strength | | | |
|---|---|---|---|---|---|---|---|---|
| | | | | | Maxi. stresses MPa | | Modules MPa | |
| | | | | | at 20° | 80° | 20° | 80° |
| Glass E | PETP* | 40 | 20 × 2 | 1.80 | 600 | 310 | 23,000 | 21,500 |
| Glass E | PBTP | 33.2 | 10 × 4 | 1.74 | 610 | 245 | 25,000 | 16,400 |
| Carbon | PETP | 28 | 20 × 2 | 1.47 | 530 | 265 | 40,000 | 33,000 |
| Carbon | PETP | 30.5 | 10 × 4 | 1.44 | 500 | 280 | 39,500 | 23,000 |
| Glass E | PA-6.6 | 42.2 | 20 × 2 | 1.65 | 560 | 220 | 24,000 | 22,000 |
| Glass E | PA-6.6 | 40 | 10 × 4 | 1.70 | 600 | 195 | 26,000 | 15,000 |

-continued

| Nature of reinforcement | Polymer | Reinf. rate % by volume | Profile cross-section mm × mm | Density | Flexional strength | | | |
|---|---|---|---|---|---|---|---|---|
| | | | | | Maxi. stresses MPa | | Modules MPa | |
| | | | | | at 20° | 80° | 20° | 80° |
| Glass E | P P | 41 | 20 × 2 | 1.55 | 290 | 80 | 23,000 | 14,000 |

Abbreviations:
PETP: polyethylene terephtalate
PBTP: polybutylene terephtalate
PA-6.6: 6.6. polyamide
P P: polypropylene (3) A product with unidirectional reinforcement and thermosetting matrix consisting of a phenolic matrix of the commercial type "novolaque" of fine powder and a reinforcement of glass fibers E, as a flat ribbon of 20 mm ×2 mm, wherein the resin is prepolymerized by heating during the process. After molding under conditions similar to Example 1, and resin curing, the characteristics of the obtained composites for three reinforcement rates were the following:

| Fiber rate by volume | Flexional strengths | | | |
|---|---|---|---|---|
| | Stresses MPa | | Modules MPa | |
| | at 20° | 150° | 20° | 150° |
| 18.5 | 530 | — | 16,400 | — |
| 34.0 | 830 | 720 | 27,000 | 25,000 |
| 38.7 | 960 | — | 29,000 | — |

(4) Composites with unidirectional reinforcement molded from semiproducts according to Example 1 or Example 3, with thermostable thermoplastic or thermosetting matrices.

| Matrix | Reinforcement | Reinforcement rate % by vol. | Flexional properties | | | | | | | |
|---|---|---|---|---|---|---|---|---|---|---|
| | | | Maxi. stresses MPa | | | | Modules MPa | | | |
| | | | 20° | 80° | 130° | 250° | 20° | 80° | 130° | 250° |
| Polysulfone | Carbon | 52 | 1200 | 1000 | 650 | — | 94500 | 87000 | 71000 | — |
| P.S.P.* | Carbon | 60–65 | 1500 | — | — | 1200 | 91000 | — | — | 90000 |
| P.S.P.* | Glass R | 65 | 1800 | — | — | 1200 | — | — | — | — |
| Thermostable epoxy | Carbon | 60 | 1600 | — | 1650 | — | 115000 | — | 119000 | — |

*Polystyryl pyridine (5) Profiles with isotropic unidirectional mixed reinforcement: the described installation is also usable for continuous production of profiles, to the unidirectional reinforcement of which an isotropic reinforcement was added, for example, a mat of entangled continuous fibers providing for the transverse rigidity of the assembly. Such a mat can be entered simultaneously with the unidirectional fibers(at the entry station A) as a continuous strip presented on one side or on both sides of the beam of said unidirectional fibers. Then, in the sequence of operations the supply of the polymer quantity required for the isotropic mat coating is determined in any appropriate manner.

EXAMPLE 1

An experiment was conducted to determine the amount of polymer taken up by fibers immersed therein. A powder of polyamide having an average particle dimension of from 250 to 500 microns was used to form a suspension. Glass fibers having a diameter of from 10 to 14 microns were passed through said suspension at a constant speed of 0.6 meters/minute. The quantity of polymer taken up by the fibers varied from 40–45% for a polymer concentration in the suspension of 10 grams/-liter to 60–65% for a polymer concentration in the suspension of 80 grams per liter.

EXAMPLE 2

A second experiment was carried out as in Example 1 using polyamide having an average particle dimension of 25 microns. The quantity of polymer retained by the fibers was 40–45% for a concentration of 120 grams of polymer per liter of suspension, and 65–70% for a concentration of 400 grams polymer per liter of suspension.

The process of the present invention is not analogous to coating a surface with a polymeric film, but is a method of introducing polymeric particles between fibers in order to provide a reinforced matrix. Trials were conducted to compare the coating of kraft paper and the impregnation of glass fibers according to the present invention with suspensions of polymers in the same range of concentrations, which trials showed that the two procedures are not at all similar in nature.

Experiments were carried out with polymers of the following granulometries:
polyethylene, from about 100–200 microns
polypropylene, approximately 200 microns
polyamide 6-6, approximately 25 microns All of the above particulate polymers were dispersed at concentrations ranging from 50 to 10% polymer by weight of suspension.

With a 50% concentration of polymer, the suspensions were in the form of wet solids or pastes, the consistency of which varied with the shape of the particles. The polypropylene particles were a regular round shape; a smoother and less viscous paste was obtained than with polyethylene having the same granulometry, the grains of which are of irregular shape. A smoother paste was obtained with a more finely divided powder, i.e., about 25 microns.

A Waring-type laboratory mixer was used to obtain very efficient stirring to make the suspensions smoother and to make the dispersions stable with all of the powders studied.

All of the above dispersion could be used to form a coating on kraft paper. However, when glass fibers were immersed in the suspensions, only in the best cases were even an irregular coating of the fibers obtained. When passing the glass fibers through the suspension, there was an irregular dragging along of the polymer dispersion. Because of the high viscosity of the suspension, the stirring of the suspension damaged the fibers which were to be treated.

With concentrations of 40% polymer, the addition of additional liquid yielded smoother and less viscous pastes than above. However, even with these pastes, it was not possible to use the process of the present invention because a sufficiently efficient stirring of the dispersion damaged the glass fibers.

With polymer concentrations of approximately 10% by weight, the dispersions were all suitable for use in the process of the present invention, independent of the granulometry of the polymer particles. The stability of the dispersions depended on the granulometry of the polymer powders, so that only a relatively good stability was obtained with powder of 25 microns (organosol), while setting times were about 1.5 minutes for polyethylene of 100 microns and 1 minute for polypropylene of 200 microns.

When using these different dispersions to coat kraft paper with a paint brush, the following results were obtained: With the finely divided dispersion (25 micron organosol), a regular film was obtained over the entire surface of the paper. The other dispersions provided only a very irregular film on the paper.

Glass fibers passed through the 10% polymer dispersions provided acceptable matrices with good penetrations of the polymer grains between the glass filaments, with no damage to the filaments.

It is also applicable to the production of open profiles of the U-or I-shaped iron type, but this list is not limitative; their behaviour in the transverse direction can also be improved by adding an isotropic reinforcement thereto.

This invention is also suitable for producing closed, circular or polygonal, profiles as well as manufacturing semi-products as thin ribbons or rushes usable for realizing coiled structures.

It must be noted that the products obtained according to this invention have the supplementary characteristic of presenting a porosity lower than 2%, such porosity being calculated by applying the following formula:

$$P = 100 - d_c \left( \frac{V_F}{d_F} + \frac{V_P}{d_P} \right)$$

where $d_C$ is the experimentally measured density of the composite, $V_F$ is the fiber rate by volume in percentage of the composite, $V_P$ is the polymer rate by volume in percentage of the composite, $d_F$ is the fiber density, $d_P$ is the polymer density.

It will be understood that this invention was only described in a purely explanatory and not at all limitative manner and that any useful applications thereof can be made without departing from its scope as defined in the appended claims.

We claim:

1. A method for forming a unidirectionally reinforced polymeric matrix which is reinforced with reinforcing substantially regularly distributed natural or synthetic mineral or organic fibers comprising:
   providing a suspension of particles of up to 500 microns in diameter of the polymeric material of the matrix to be reinforced in a volatile, nonaqueous, inert liquid which is inert both with respect to the polymer and to said reinforcing fibers the concentration of said polymeric material in said suspension being not greater than 10%;
   continuously passing through said suspension said reinforcing fibers while agitating the suspension so that said fibers are separated into their unitary filaments to expose maximum surface of the fibers to the suspension;
   assembling said unitary filaments to maintain therebetween and within fibers leaving the suspension, the desired quantity of said polymer particles regularly distributed on said unitary filaments;
   submitting the obtained impregnated fibers to a thermal treating to bring the polymer to the liquid or pasty state, and collecting said liquid;
   supplying said fibers to a forming unit to obtain a finished matrix of a desired shape.

2. A process according to claim 1, wherein the concentration of the polymeric material in the suspension liquid is maintained constant at a predetermined value.

3. A process according to claim 1, wherein the nonaqueous inert and volatile liquid is of a density substantially equal to that of the polymeric material.

4. A method for forming a unidirectionally reinforced polymeric matrix which is reinforced with reinforcing substantially regularly distributed natural or synthetic mineral or organic fibers comprising:
   providing a suspension of particles up to 500 microns in diameter of the polymeric material of the matrix in a volatile non-aqueous liquid which is inert with respect to said polymeric material and to said reinforcing fibers, and in the substantial absence of any moistening, dispersing, or emulsifying agent the concentration of said polymeric material in said suspension being
   not greater than 10%;
   passing a bundle of said reinforcing fibers through said suspension while separating said bundle by mechanical agitation into individual parallel yarns so as to permit maximum contact between said yarns and said suspension, and, while maintaining the temperature of said suspension sufficiently low to inhibit evaporation of said inert volatile non-aqueous liquid;
   the size of the particles being at least as large as the diameter of the yarns;
   continuously passing said bundle to a drying zone, and applying heat in said drying zone to evaporate said inert volatile non-aqueous liquid, thereby leaving said polymeric particles entrapped on and within said bundle in a controlled amount;
   condensing the inert volatile non-aqueous liquid which has been evaporated from said bundle;
   continuously passing said bundle of yarns containing said polymeric material to a heating zone and applying heat to convert the polymeric particles to the molten or pasty state; and
   continuously passing said coated bundle of yarns to a pressing zone and effecting pressing thereof to form a linearly reinforced polymeric matrix.

5. A method according to claim 4, wherein said inert volatile non-aqueous liquid is selected from the group consisting of trichlorotrifluoroethane, methanol, ethanol and mixtures thereof.

6. A method according to claim 4, wherein said bundle is separated into yarns within said suspension.

* * * * *